Patented Oct. 4, 1938

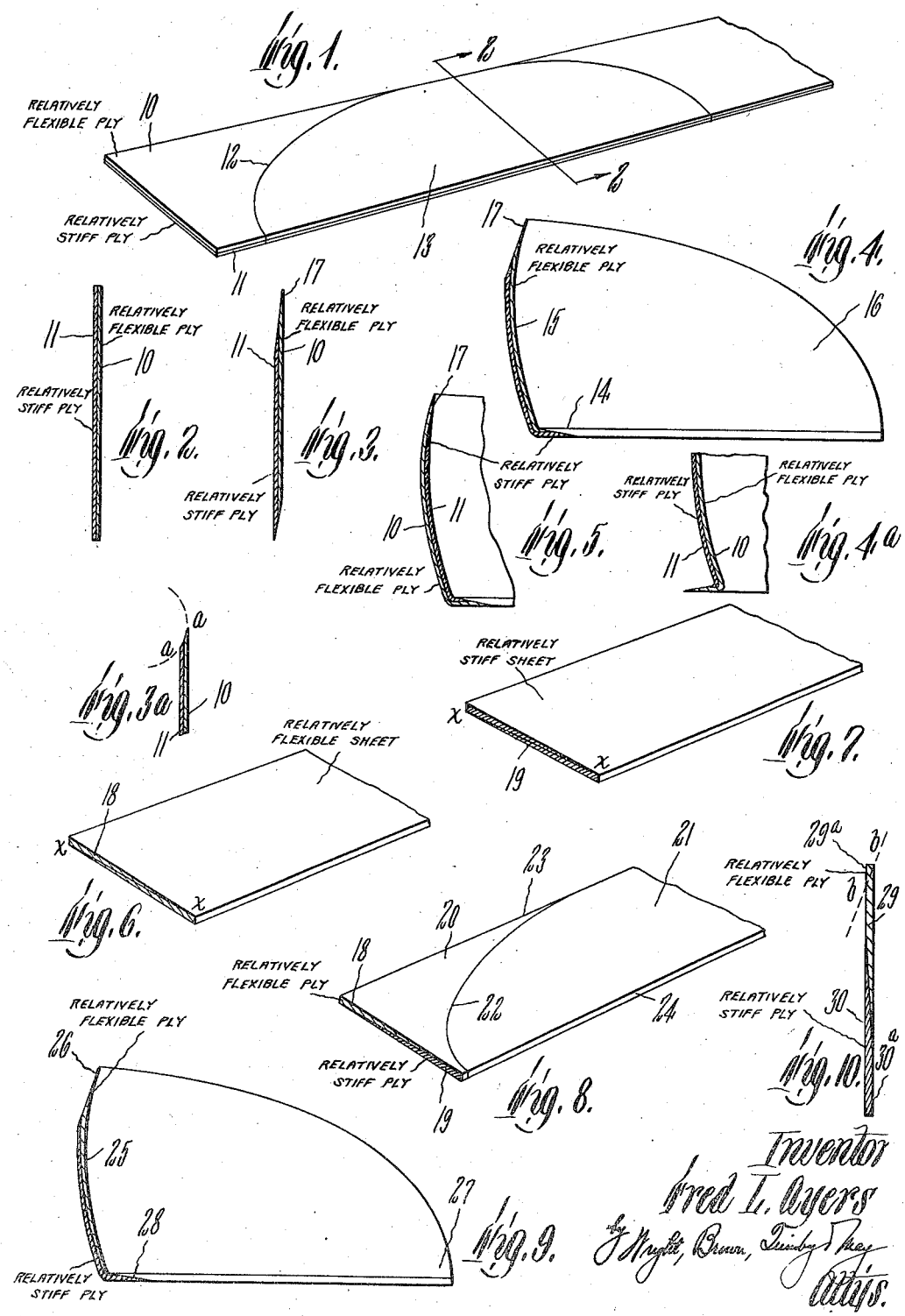

2,131,832

UNITED STATES PATENT OFFICE 2,131,832

SHOE COUNTER MANUFACTURE

Fred L. Ayers, Watertown, Mass., assignor to Brown Company, Berlin, N. H., a corporation of Maine Application May 26, 1936, Serial No. 81,840

6 Claims. (Cl. 36—68)

This invention relates to the manufacture of stiffener parts such as are incorporated in between the shoe upper and lining at the back portion of a shoe and generally known as counters or counter stiffeners. Its objective, generally stated, is to provide a counter which not only properly reinforces the back shoe portion but which affords stiffness at those regions where stiffness is desired and flexibility at those regions where flexibility is desired.

In accordance with the present invention, the counter is molded from a precut plied blank and more particularly one comprising a ply or layer of relatively stiff sheet material and a ply or layer of relatively flexible sheet material. The blank is skived so that the counter molded therefrom has feather edges and thus creates no undesirable ridges or protrusions inside the shoe. In all counters embodying the invention hereof, the plied blank is of such structure and/or is so skived at its top edge that the beveled or skived edge at the back wall or region of the counter contains minimum stiff ply material, if at all. However, this beveled or skived top edge need not be of the same flexibility at the side walls or wings of the counter as at its back wall. Indeed, the present invention may be embodied in a counter having a plied structure such that its stiffness, including that of its skived top edge, gradually increases toward the tips of its side walls or wings.

With the foregoing and other features and objects in view, the present invention will now be described with reference to the accompanying drawing wherein, Figure 1 illustrates in perspective the cutting of the counter blank from a plied sheet structure wherethrough stiff and flexible ply materials are substantially uniformly distributed.

Figure 2 is a section on the line 2—2 of Figure 1.

Figure 3 is a similar section after the blank has been skived.

Figure 3a is a fragmentary section showing a slightly modified skived edge.

Figure 4 represents a longitudinal section through the molded blank or finished counter with the flexible ply next to the foot.

Figure 4a is a fragmentary view similar to Figure 4 of a modified form of counter.

Figure 5 is a fragmentary view similar to Figure 4 but with the stiff ply next to the foot.

Figures 6 and 7 illustrate in perspective the splitting of flexible and stiff plies into sections of tapering thickness for plying into a sheet structure through which the thickness of each ply progressively varies from one side edge to the opposite one.

Figure 8 illustrates a fragment of the resulting plied sheet and the mode of cutting a counter blank therefrom.

Figure 9 is a longitudinal section through the skived and molded blank cut from the plied sheet structure of Figure 8.

Figure 10 represents a section through a variant of the sheet structure of Figure 8.

Plied sheet material for the counter hereof is shown in Figure 1 as a strip or band comprising a relatively flexible ply 10 and a relatively stiff ply 11 of substantially uniform and equal thickness. The strip may be of a width corresponding to the size of the counter blank to be cut or died out therefrom. The line of cutting 12 of a typical counter blank 13 from the strip is depicted; and such a blank may be molded into a counter which, as appears best in Figure 4, comprises a bottom flange or heel seat 14 from which are upstanding the back wall 15 and the curved side walls or wings 16.

Prior to molding, however, the blank 13 is skived at its curved upper edge 12 with the skiving knife so presented to such edge that, as seen in Figures 3 and 4, the stiff ply material is largely cut away and the flexible ply material is left as the feather edge 17. Because the feather edge is composed of the flexible ply material, it does not tend to raise a ridge in the shoe lining or discomfort the foot no matter whether the counter is molded with the flexible ply material presented next to the foot, as illustrated in Figure 4, or with the stiff ply material presented next to the foot, as illustrated in Figure 5. By using plies in the counter hereof of the appropriate different degrees of flexibility, it is possible to realize from such counter the desired reinforcement and stiffness at the back of the shoe coupled with the flexibility at its skived upper edge incident to the removal therefrom of relatively stiff ply material. If desired, the skiving of the curved upper edge 11 of the counter blank may be effected with a curved knife, as on the dotted line a—a of Figure 3a, which trims away more of the stiff ply material and less of the flexible ply material and thus leaves a feather edge whose flexibility extends downwardly to a greater extent. The bottom or straight edge of the counter blank hereof is skived to present the desired feather edge at the heel seat or bottom flange of the counter molded therefrom; and this skiving may largely remove or trim away the flexible ply material, as illustrated in Figures 3 and 4, to yield a relatively stiff heel seat, as usual. However, it may be desirable to skive the bottom or straight edge of the counter blank hereof to trim away largely the relatively stiff ply material and thus to produce in the molded counter a heel seat of a flexible character, as depicted in Figures 4a and 5. The counter of Figure 4a, being of the type intended for use in a so-called stitch-down shoe, is shown with its bottom flange turned outwardly. Ordinarily, the bottom edge of a counter blank for a stitch-down shoe is notched at spaced localities to allow for the stretching or expansion that is necessary in molding or forming-up the outturned flange. When, however, the bottom edge of the counter blank hereof is skived so that the relatively stiff ply material is largely trimmed away and the flexible ply material is composed essentially of suitably stretchable, rubber-impregnated artificial leather of the character hereinafter described, no notching of such edge need be effected prior to molding or forming-up the outturned flange, since the resulting skived edge lends itself to the necessary stretching without the usual notches. In molding or forming-up the inturned bottom flange of the usual form of counter, it is commonly the case that the bottom flange is more or less crimped or pleated as the bottom edge is crowded into such a flange and the resulting crimps or pleats may have to be compressed heavily to present the desired smooth surfaces. However, when the bottom edge of the counter blank hereof is skived to consist largely of suitably compressible as well as stretchable flexible ply material, such as the rubber-impregnated artificial leather of the character hereinafter described, the tendency toward developing irregular crimps or pleats in the bottom flange of the resulting molded counter is minimized and such irregular crimps or pleats as may be formed therein are easily removed by ironing or compressing the flange.

It may be desirable that the side walls or wings of the counter, which are of gradually diminishing height toward their tips or front ends, be of gradually increased stiffness toward their tips so as to offset the gradual diminution in height and stiffening area. The counter of the present invention may embody such advantageous variable stiffness when cut from a plied sheet or strip whose flexible and stiff plies are of progressively varying thickness from one side edge of the strip to the opposite side edge. To this end, a strip of the relatively flexible ply and a similarly dimensioned strip of the relatively stiff ply may each be split or cut, as illustrated in Figures 6 and 7, along a diagonal plane x—x from one corner edge of the strip to the opposite corner edge to form two sections or strips of transversely varying thickness, whereupon the section of relatively flexible ply material 18 and the section of relatively stiff ply material 19 may be bonded together at their inclined or cut faces to form a plied strip structure 20 in which, as shown in Figure 8, the thickness of each ply progressively diminishes from one side edge to the opposite side edge.

The strip 20, which is of a width corresponding to the size of counter blank to be cut therefrom, may then be cut or died out into counter blanks, each of which 21 has a curved upper edge 22, whose highest zone substantially coincides with the strip edge 23 composed practically entirely of flexible ply material, and a straight lower edge which substantially coincides with the strip edge 24 composed practically entirely of stiff ply material. The blank 21 is skived at its curved upper edge 22 prior to being molded into a finished counter 25 which, as shown in Figure 9, has a skived edge 26 composed practically entirely of the flexible ply material at its highest or back zone but gradually increases in content or thickness of the stiff ply material, as the height of the counter walls gradually diminish, toward the wing tips or extremities 27 whereat the skived edge is composed practically entirely of the stiff ply material. The skived bottom flange or heel seat 28 of the counter is shown composed practically entirely of the stiff ply material and hence has the high degree of stiffness sometimes desired therein.

If desired, the plied strip or sheet from which the counter blank hereof is cut may be built up from relatively flexible and relatively stiff plies each similarly tapering over most of its width but provided with a substantial marginal portion of uniform or unreduced thickness. Such a plied strip is shown in Figure 10 as comprising the relatively flexible ply 29 and the relatively stiff ply 30 bonded together at their inclined faces, the ply 29 having an intact or uniformly thick upper marginal portion 29a and the ply 30 having an intact or uniformly thick lower marginal portion 30a. When a counter blank is cut from such a plied strip and the upper curved edge of the blank skived along the dotted line b—b, the feather edge developed at the highest or back zone of the resulting counter is composed entirely of the flexible ply material and hence has the high flexibility desired at such zone. On the other hand, the portion 30a of only stiff ply material becomes the bottom flange or heel seat in the resulting counter and when skived thus gives such flange the high stiffness sometimes desired therein.

Sheets of various origins or compositions may serve as the materials of construction for the counters hereof. For instance, leather and leatherboard may be either the flexible or stiff plies, so long as the leather or leatherboard has the degree of flexibility or stiffness required for either or both such plies. In some instances, leather of the proper pliancy or flexibility may be the flexible ply material and comparatively stiff fiberboard or leatherboard may be the stiff ply material. In lieu of leather, artificial leather, such as a rubber-impregnated fibrous base, may serve as the flexible ply material, whereas comparatively stiff fiberboard, leatherboard, or leather may serve as the stiff ply material. All of the enumerated materials, including such interfelted fiber base materials as fiberboard, leatherboard, and suitably impregnated interfelted fiber bases, may be used to good advantage in making the counters hereof, for they are readily skivable and do not tend to fray at their edges when skived, as is true of woven fabric, so that both plies may be satisfactorily skived, as, for instance, when the stiff ply material is largely skived away at the upper edge of the counter and the flexible ply material largely skived away at the bottom flange in accordance with an aspect of the invention hereinbefore described. It might be noted that an absorptive fibrous web of the sort produced on papermaking machinery may be impregnated with rubber latex compositions and then dried to produce artificial leather admirably adapted, because of its more or less stretchable and compressible qualities and its other characteristics, for use as the flexible ply material herein; and such artificial leather may be plied with comparatively stiff fiberboard to produce at low expense plied sheet material from which counters embodying the present invention may advantageously be fabricated.

I have indicated that the plied strip or sheet structure of Figure 8 involves the use as starting material of strips or sheets of different flexibilities. In some instances, however, only flexible sheet material, such as rubber-impregnated artificial leather, need be employed; and after a strip of such flexible sheet material has been split into two transversely tapering sections, one section may be impregnated or coated with suitable stiffening composition and bonded to the relatively flexible section to produce a plied or composite strip structure from which the counter hereof may be fabricated. There are other changes possible in the counters of the present invention and/or in their method of manufacture, including the use of flexible and stiff plies of different uniform thicknesses or of different tapering thicknesses in the plied strip from which the counter blanks are cut, the cutting of the counter blanks from a plied sheet of a width capable of yielding two or more counter blanks transversely thereof, the cutting of counter blanks of a wide variety of shapes and moldable into finished counters of configurations especially at their wings other than that herein described and illustrated, etc., all of which changes may be made without departing from the inventive principles hereof or the scope of the appended claims.

I claim:

1. A shoe counter of the type equipped with a bottom flange and back and side walls upstanding from said flange, comprising a two-ply sheet structure one of whose plies is flexible and the other relatively stiff, the thickness of said flexible ply progressively decreasing from the highest zone of said walls to the zone of said bottom flange and the thickness of said relatively stiff ply progressively decreasing from the zone of said bottom flange to the highest zone of said walls.

2. A shoe counter of the type equipped with a bottom flange and back and side walls upstanding from said flange, comprising a two-ply sheet structure one of whose plies is flexible and the other relatively stiff, the thickness of said flexible ply progressively decreasing from the highest zone of said walls to the zone of said bottom flange and the thickness of said relatively stiff ply progressively diminishing from the zone of said bottom flange to the highest zone of said walls, said counter having a skived upper edge at its upstanding walls and said edge being substantially devoid of the relatively stiff ply material at least at the back wall.

3. A shoe counter of the type equipped with a bottom flange, a back wall upstanding from said flange, and side walls upstanding from said flange and of diminishing height toward their front ends, comprising a two-ply sheet structure one of whose plies is flexible and the other relatively stiff, the thickness of said flexible ply decreasing throughout the counter from the top portion of the back wall to the bottom flanged portion and the thickness of said relatively stiffer ply decreasing throughout the counter from the bottom flanged portion to the top portion of the back wall.

4. A shoe counter of the type equipped with a bottom flange, a back wall upstanding from said flange, and side walls upstanding from said flange and of diminishing height toward their front ends, comprising a two-ply sheet structure one of whose plies is flexible and the other relatively stiff, the thickness of said flexible ply decreasing throughout the counter from the top portion of the back wall to the bottom flanged portion and the thickness of said relatively stiffer ply decreasing throughout the counter from the bottom flanged portion to the top portion of the back wall, said counter having a skived upper edge at its upstanding walls and said edge being substantially devoid of the relatively stiff ply material at the back wall.

5. A shoe-counter blank comprising a two-ply structure of substantially uniform thickness throughout, one of said plies being flexible and the other being relatively stiff and both being of similarly tapering thicknesses substantially throughout the counter in opposite transverse directions.

6. A shoe-counter blank comprising a two-ply structure of substantially uniform thickness throughout, one of said plies being flexible and the other being relatively stiff and both being of similarly tapering thicknesses substantially throughout the counter in opposite transverse directions excepting for a marginal portion in each ply of substantially uniform thickness.

FRED L. AYERS.